United States Patent [19]

Yost

[11] Patent Number: 4,583,121
[45] Date of Patent: Apr. 15, 1986

[54] BACKPORCH GATING PULSE GENERATOR SUBJECT TO DISABLING DURING VERTICAL SYNC INTERVAL

[75] Inventor: Thomas D. Yost, Indianapolis, Ind.

[73] Assignee: RCA Corporation, Princeton, N.J.

[21] Appl. No.: 561,332

[22] Filed: Dec. 14, 1983

[51] Int. Cl.[4] ............................................. H04N 5/18
[52] U.S. Cl. ................................... 358/172; 358/173; 358/178
[58] Field of Search ............... 358/171, 172, 173, 178, 358/20, 34, 39, 160

[56] References Cited

U.S. PATENT DOCUMENTS 3,955,047  5/1976  Willis .................................. 358/173
4,316,214  2/1982  Yost .................................... 358/172

Primary Examiner—Tommy P. Chin
Attorney, Agent, or Firm—Eugene M. Whitacre; Paul J. Rasmussen; William H. Meagher

[57] ABSTRACT

In a TV receiver, a line-rate gating pulse generator includes a source of line-rate timing pulses of "backporch" timing relative to the horizontal blanking intervals of received TV signals. Normally, the time constant of a capacitor charging circuit, enabled by the leading edge of each timing pulse, is determinative of a fixed, finite width for output gating pulses which are generated in response to the timing pulses. However, during the appearance of a field-rate pulse (e.g., vertical drive pulse), the charging circuit is altered such as to establish a zero width for the output gating pulses, resulting in a desired field-rate blanking of the line-rate gating pulse output.

8 Claims, 1 Drawing Figure

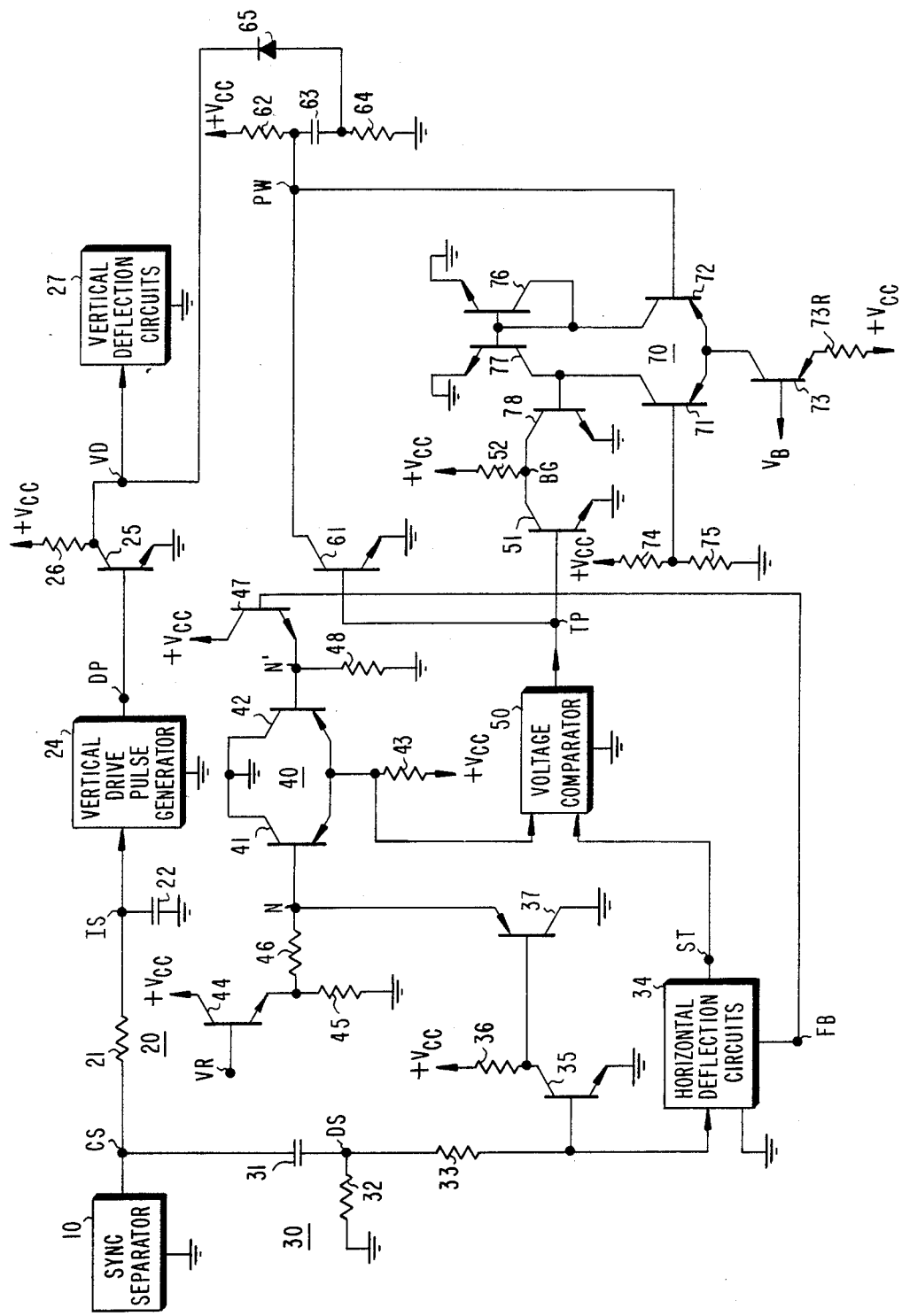

BACKPORCH GATING PULSE GENERATOR SUBJECT TO DISABLING DURING VERTICAL SYNC INTERVAL

The present invention relates generally to gating pulse generators for use in television receivers, and particularly to line-rate gating pulse generators subject to periodic field-rate disabling.

In a copending U.S. patent application Ser. No. 561,280, of R. Shanley, et al., entitled "Keyed DC Stabilization System With Protection From Error Introduction During Vertical Sync Interval" and concurrently filed herewith, now U.S. Pat. No. 4,554,577, a system for stabilizing the DC levels of the respective color signals in a color television receiver is disclosed which employs a plurality of DC control loops using keyed voltage comparators. In the Shanley, et al. system, the comparator keying is effected in response to recurring line-rate gating pulses timed so that during active scan time they coincide with backporch segments of successive horizontal blanking intervals of the received signals. To avoid error introduction during the vertical sync intervals of the received signals (when such timing of the recurring pulses will result in coincidence with exhibitions of sync peak level, rather than blanking level, by the received signal), the Shanley, et al. arrangement seeks to bar comparator keying during all, or a significant portion of, each vertical sync interval.

The present invention is directed to a line-rate gating pulse generator which is subject to periodic field-rate disabling in such a manner as to interrupt gating pulse appearances throughout a selected portion of each field interval of the received signals, and which may be used, for example, to achieve the keying preclusion sought by Shanley, et al. above. In accordance with the principles of the present invention, the desired gating pulse interruptions may be obtained through the use of a relatively simple and inexpensive modification of gating pulse generators of the type disclosed in the copending U.S. patent application Ser. No. 527,889 of R. Fernsler, et al.

In the aforementioned Fernsler, et al. application, a capacitor charging circuit, enabled at the initation of gating pulse generation, controls the timing of the termination of gating pulse generation, ensuring constancy of gating pulse width. Pursuant to the principles of the present invention, a simple modification of the capacitor charging circuit of the Fernsler, et al. arrangement to a field-rate keyed form enables the gating pulse width to be effectively reduced to zero during the period when gating pulse interruption is desired.

In accordance with an illustrative embodiment of the present invention, a gating pulse generator includes an output load across which the generator develops said gating pulse, and first and second transistors having normally conducting emitter-collector paths, with the emitter-collector path of the first transistor serially coupled with the output load. Timing pulses recurring at a line rate suppress conduction in the emitter-collector paths of the first and second transistors during each timing pulse appearance. A first resistor, a capacitor, and a second resistor are connected in series across a DC potential supply, with the emitter-collector path of the second transistor shunted across the series combination of the capacitor and the second resistor. A third transistor, responsive to field-rate pulses indicative of the timing of recurring vertical sync intervals, has an emitter-collector path rendered non-conductive during each field-rate pulse appearance. The series combination of a diode and the emitter-collector path of the third transistor is connected in shunt with the second resistor, with the diode poled to exhibit a conductive state when cutoff of the second transistor coincides with the third transistor's conduction. A fourth transistor, with its emitter-collector path shunting the first transistor's emitter-collector path, is rendered conducting when the voltage across the series combination of the capacitor and the second resistor exceeds a reference level.

In operation of the above-described embodiment, during each field-rate pulse appearance, each initiation of cut off of said second transistor is accompanied by a step rise of the voltage across the series combination of the capacitor and the second resistor. The resistance value of the second resistor is desirably selected such that the magnitude of said step rise exceeds the magnitude of said reference level. The charging time constant of a charging circuit formed by the first resistor, the capacitor, the diode in its conductive state, and the emitter-collector path of the third transistor in its conductive state, is determinative of the gating pulse width in the periods intervening between successive field-rate pulses.

In the accompanying drawing, the sole FIGURE illustrates, partially schematically and partially by block representation, a portion of a television receiver including a line-rate gating pulse generator subject to field-rate disabling in acordance with an illustrative embodiment of the present invention.

In the illustrated receiver portion, a sync separator 10, functioning to separate deflection synchronizing pulses from the image-representative components of received video signals, develops a composite sync waveform at its output terminal CS. The composite sync signals appearing at terminal CS are commonly supplied to an integrating circuit 20 and to a differentiating circuit 30. The integrating circuit 20 comprises a resistor 21 serially disposed between separator output terminal CS and the integrating circuit output terminal IS, and a shunt capacitor 22 connected between terminal IS and a reference potential point (ground). The differentiating circuit 30 comprises a capacitor 31 serially disposed between separator output terminal CS and the differentiating circuit output terminal DS, and a shunt resistor 32 connected between terminal DS and ground.

The integrated version of the composite sync signal which is developed at terminal IS is supplied to a vertical drive pulse generator 24 to synchronize the development of a train of vertical drive pulses at the generator output terminal DP. The pulse train at terminal DP is applied to the base electrode of an NPN amplifier transistor 25, disposed with its emitter electrode grounded and with its collector electrode connected via a resistor 26 to the positive terminal ($+V_{cc}$) of an operating potential supply. Illustratively, the vertical drive pulses at terminal DP comprise negative-going pulses of an eight-line duration, with a leading edge coincident with, or slightly delayed with respect to, the beginning of the received signal's vertical sync interval. Amplified vertical drive pulses appear at terminal VD (directly connected to the collector electrode of transistor 25) and are supplied to the receiver's vertical deflection circuits 27 to control the development of field-rate deflection waves.

The differentiated version of the composite sync signal which appears at terminal DS is coupled via a resistor 33 to the base electrode of an NPN transistor 35, and to the receiver's horizontal deflection circuits 34 to synchronize the development of line rate deflection waves. The deflection circuits 34 include a synchronized horizontal oscillator from which a sawtooth voltage wave is derived for delivery to an output terminal ST. Also available from the horizontal deflection circuits 34 are periodically recurring horizontal flyback pulses, appearing at output terminal FB.

The emitter electrode of transistor 35 is grounded, while the collector electrode thereof is connected via a resistor 36 to the $+V_{cc}$ supply terminal. The collector electrode of transistor 35 is also directly connected to the base electrode of a PNP emitter-follower transistor 37. Transistor 37 is disposed with its collector electrode grounded, and with its emitter electrode directly connected to a first input terminal (N) of a non-additive mixer 40.

The non-additive mixer 40 comprises a pair of PNP transistors 41 and 42, disposed with joined collector electrodes directly connected to ground, and with joined emitter electrodes connected to the $+V_{cc}$ supply terminal via an emitter resistor 43. The base electrode of transistor 41 is directly connected to the aforementioned first mixer input terminal N, while the base electrode of transistor 42 is directly connected to a second mixer input terminal N'.

Mixer input terminal N is additionally connected via a resistor 46 to the emitter electrode of an NPN transistor 44 disposed as an emitter-follower, with its collector electrode directly connected to the $+V_{cc}$ supply terminal, and with its emitter electrode returned to ground via resistor 45. The base electrode of the emitter-follower transistor 44 is directly connected to terminal VR, to which a positive DC potential of a selected level is supplied.

Mixer input terminal N' is directly connected to the emitter electrode of an NPN transistor 47 disposed as an emitter-follower, with its collector electrode directly connected to the $+V_{cc}$ supply terminal, and with its emitter electrode returned to ground via resistor 48. The base electrode of the emitter-follower transistor 47 is connected to terminal FB, at which appear horizontal flyback pulses developed by the horizontal deflection circuits 34.

The output of the non-additive mixer 40, which is developed at the joined emitter electrodes of transistors 41 and 42, is supplied to a voltage comparator 50 for comparison with sawtooth voltage waves supplied from terminal ST of the horizontal deflection circuits 34.

The output of voltage comparator 50, comprising negative-going, line-rate timing pulses developed when the comparator input from mixer 40 is more positive than the comparator input from terminal ST, appears at a timing pulse output terminal TP, which is directly connected to the base electrodes of a pair of NPN transistors 51 and 61. The emitter electrodes of transistors 51 and 61 are both directly connected to ground. The collector electrode of transistor 51 is directly connected to terminal BG, linked by a resistor 52 to the $+V_{cc}$ supply terminal. Terminal BG constitutes the output terminal of the illustrated gating pulse generating apparatus.

Resistor 62, capacitor 63, and resistor 64 are connected in series, in the order named, between the $+V_{cc}$ supply terminal and ground. Terminal PW, at the junction of resistor 62 and capacitor 63, is directly connected to the collector electrode of the aforementioned transistor 61, the connection disposing the emitter-collector path of transistor 61 in shunt with the series combination of capacitor 63 and resistor 64. A diode 65 is disposed with its anode connected to the junction of capacitor 63 and resistor 64, and with its cathode connected to terminal VD, with the consequence that the series combination of diode 65 and the emitter-collector path of transistor 25 is connected in shunt with resistor 64.

A voltage comparator 70, comprising a pair of PNP transistors 71, 72 with joined emitter electrodes, receives a first input via the direct connection of terminal PW to the base electrode of comparator transistor 72. The second input to comparator 70 is derived from a voltage divider formed by resistors 74 and 75, serially disposed between the $+V_{cc}$ supply terminal and ground. The divider output, appearing at the junction of resistors 74 and 75, is directly applied to the base electrode of comparator transistor 71. A current source for the comparator transistors 71, 72 is formed by PNP transistor 73, disposed with its collector electrode directly connected to the joined emitter electrodes of transistors 71 and 72, with its emitter electrode returned to the $+V_{cc}$ supply terminal via an emitter resistor 73R, and with its base electrode connected to a bias supply terminal $V_B$.

The collector electrode of comparator transistor 72 is directly connected to the joined base and collector electrodes of a diode-connected NPN transistor 76, disposed with its emitter electrode grounded. The base electrode of transistor 76 is directly connected to the base electrode of NPN transistor 77. Transistor 77 is disposed with its collector electrode directly connected to the collector electrode of comparator transistor 71, and with its base-emitter path shunting the base-emitter path of the diode-connected transistor 76. The collector electrode of comparator transistor 71 is also directly connected to the base electrode of an NPN transistor 78. Transistor 78 is disposed with its emitter electrode grounded and with its collector electrode directly connected to the gating pulse output terminal BG, with the consequence that the emitter-collector path of transistor 78 is connected in shunt with the emitter-collector path of the previously mentioned transistor 51.

In operation of the above-described gating pulse generating apparatus, during the periods intervening between the successive line-rate timing pulse appearances at terminal TP, transistors 51 and 61 are strongly conducting, holding terminal PW and output terminal BG at a low potential. The leading edge of each negative-going timing pulse initiates cutoff of transistors 51 and 61. The resultant effect on the voltage at output terminal BG depends upon the conduction condition of the vertical drive pulse amplifying transistor 25. That is, as explained below, the output potential behavior at terminal BG during vertical drive pulse appearances at terminal DP (when transistor 25 is cut off) will differ from that occurring during periods intervening between successive vertical drive pulse appearances (when transistor 25 is strongly conducting).

Considering first the conditions prevailing during the periods intervening between successive vertical drive pulse appearances, the cutoff of transistor 61 releases terminal PW for voltage excursions thereat, and permits formation of a capacitor charging circuit comprising, in series, resistor 62, capacitor 63, diode 65 in its conductive state, and the collector-emitter path of the conducting transistor 25. Resistor 64 is effectively bypassed by a low impedance path formed by conducting diode 65 and the collector-emitter path of conducting transistor 25. While an initial step rise of the voltage at terminal PW (of a magnitude equal to the voltage drop across conducting diode 65) accompanies the release of terminal PW, this rise is not of sufficient magnitude to elevate the potential at the base of comparator transistor 72 to the level of the reference voltage supplied to the base of comparator transistor 71 from voltage divider 74/75, wherefore comparator 70 remains in an operating state (inclusive of cutoff of comparator transistor 71) which holds transistor 78 in a cutoff condition. In the absence of conduction by transistor 78, the cutoff of transistor 51 allows output terminal BG to rise in potential to form the leading edge of an output gating pulse of positive-going form.

Terminal BG remains at a high positive potential until an exponential rise of the potential at terminal PW (due to the charging of capacitor 63) reaches a reference level permitting a turn-on of comparator transistor 71 and a consequent initiation of conduction by transistor 78. Conduction by transistor 78 returns terminal BG to a low potential to define the trailing edge of the output gating pulse. Subsequently, when the negative-going timing pulse at terminal TP terminates, transistors 51 and 61 return to a conducting state, and terminal PW swings low, returning comparator 70 to its normal operating state and cutting off transistor 78. The cutoff of transistor 78 does not affect the potential at output terminal BG, since the resumed conduction by transistor 51 continues to hold terminal BG at a low potential. It will be appreciated that the time constant of the capacitor charging circuit is determinative of the output gating pulse width under the above-described operating conditions, with variations of the timing pulse width not disturbing a desired constancy of the output gating pulse width.

Considering now the conditions prevailing during vertical drive pulse appearances, whenever cutoff of transistor 61 releases terminal PW from a clamped condition, conduction by diode 65 does not result since the diode cathode is at an elevated potential due to the cutoff of the vertical drive pulse amplifying transistor 25. Resistor 64 is thus unbypassed, and an initial step rise of the voltage at terminal PW of a magnitude determined by the resistance value of resistor 64 now accompanies the release of terminal PW. By suitable choice of this resistance value, the magnitude of this step rise will exceed the aforementioned reference level, wherefore a change in operating state of comparator 70 and a turn-on of transistor 78 are initiated by the leading edge of the timing pulse at terminal TP. A rise in potential at terminal BG in response to a timing pulse appearance at terminal TP is thus precluded throughout each vertical drive pulse appearance, since each cutoff of transistor 51 is accompanied by a simultaneous turn-on of transistor 78. The desired field-rate blanking of line-rate gating pulses is thus readily achieved.

As described above, elements 62, 63, 64, 65 and 25 cooperate to form a keyed pulse width control circuit, which in one mode of operation, determines a finite gating pulse width in accordance with an RC time constant, and which, in a second mode of operation, establishes a zero pulse width to effect a selective suppression of output gating pulses. It may be noted that addition of the field-rate blanking feature to a line-rate gating pulse generator of the type disclosed in the aforementioned copending Fernsler, et al. patent application requires the addition of only two circuit elements: resistor 64, and diode 65.

The particular mode of timing pulse generation employed in the illustrated embodiment is the same as that disclosed in the aforementioned Fernsler, et al. patent application. Reference may be made to that patent application for a detailed explanation of the operation of the timing pulse generating apparatus (35, 37, 40, 44, 47, 50, etc.), a description of said operation being briefly summarized below.

Non-additive mixer 40 provides an output which follows the least positive of its respective inputs. One input comprises positive-going horizontal flyback pulses from terminal FB of deflection circuits 34, while the other input normally corresponds to a reference DC voltage (equal to the voltage at terminal VR less the base-emitter offset potential, $V_{be}$, of transistor 44), but is periodically depressed therefrom during each horizontal sync interval as it follows an inverted version of the output of differentiating circuit 30. The waveform of the mixer output comprises a clipped, positive-going flyback pulse with a central (negative-going) notch. The output of voltage comparator 50 (at terminal TP) is normally high, but swings low when the input from mixer 40 swings above a declining return stroke of the sawtooth voltage wave input from terminal ST. This change in the operating state of comparator 50 is normally initiated at a point in the rise of the tailing edge of the central notch of the mixer's output waveform.

With the timing of the notch's trailing edge coinciding with trailing edges of the received signal's horizontal sync pulses, the resultant timing pulses at terminal TP have the desired "backporch" location. The output of comparator 50 remains low until a decline of the clipped flyback pulse component returns comparator 50 to its original operating state, terminating the timing pulse.

It should be appreciated that, while the above-described technique provides an advantageous approach to the generation of the timing pulses at terminal TP, the principles of the present invention are readily applicable to use with other forms of timing pulse generation.

While in some possible applications of the present invention, the output of gating pulse generator of the illustrated form may be used directly for keying purposes, a particular contemplated application of the present invention is its use in the formation of a multilevel keying waveform of the so-called "sandcastle" type (for application to an input terminal of an integrated circuit, bearing, inter alia, a sandcastle decoder from which a plurality of different keying waves may be derived). Reference may be made to the aforementioned copending U.S. patent application (Ser. No. 561,280) of R. Shanley, et al., for an example of a trilevel sandcastle pulse encoding/decoding system in which a gating pulse generator of the herein described type may be used to advantage.

What is claimed is:

1. In a television receiver for receiving composite video signals inclusive of respective line and field deflection synchronizing components, said field deflection synchronizing components occupying periodically recurring vertical sync intervals; a line-rate gating pulse generator, subject to field-rate disabling, for developing gating pulses, comprising:

a source of periodic timing pulses recurring at a line rate;

a source of field-rate pulses indicative of the timing of said recurring vertical sync intervals;

an output load across which said generator develops said gating pulses;

a DC potential supply;

first and second transistors having normally conducting emitter-collector paths, the emitter-collector path of said first transistor being serially coupled with said output load across said DC potential supply;

a first resistor, a capacitor, and a second resistor connected in series across said DC potential supply; the emitter-collector path of said second transistor being shunted across the series combination of said capacitor and said second resistor;

means for utilizing said timing pulses to suppress conduction in the emitter-collector paths of said first and second transistors during each timing pulse appearance;

a third transistor, responsive to said field-rate pulses, and having an emitter-collector path rendered nonconductive during each field-rate pulse appearance but maintained in a conductive state during the periods intervening between successive field-rate pulse appearances;

a diode, the series combination of said diode and the emitter-collector path of said third transistor being connected in shunt with said second resistor, with said diode being poled so as to exhibit a conducting state when suppression of conduction in the emitter-collector path of said second transistor coincides with existence of a conductive state for the emitter-collector path of said third transistor;

a fourth transistor having an emitter-collector path connected in shunt with the emitter-collector path of said first transistor; and means for rendering the emitter-collector path of said fourth transistor conducting when the voltage across said series combination of said capacitor and said second resistor exceeds a reference level.

2. Apparatus in accordance with claim 1, wherein during each field-rate pulse appearance, each initiation of a cutoff of said second transistor is accompanied by a step rise of the voltage across said series combination of said capacitor and said second resistor; the resistance value of said second resistor being such as to ensure that the magnitude of said step rise exceeds the magnitude of said reference level.

3. Apparatus in accordance with claim 2 wherein the charging time constant of a charging circuit formed by the series combination of said first resistor, said capacitor, said diode in its conductive state, and the emitter-collector path of said third transistor in its conductive state is determinative of the width of the gating pulses appearing during said intervening periods.

4. Apparatus in accordance with claim 3 wherein said source of timing pulses is responsive to said line deflection synchronization component of said composite video signals.

5. Apparatus in accordance with claim 4 wherein said field-rate pulses comprise vertical drive pulses generated in response to said field deflection synchronization component of said composite video signals.

6. In a television receiver, a line-rate gating pulse generator subject to periodic field-rate disabling comprising:

a source of periodic line-rate timing pulses;

a source of periodic field-rate pulses;

a source of DC potential; and means, responsive to said timing pulses, for developing gating pulses with leading edges normally determined by the leading edges of said timing pulses;

wherein said gating pulse developing means includes:

means for controlling the width of said gating pulses, said width controlling means normally operating in a first mode establishing a substantially fixed, finite width for said gating pulses; and means, responsive to said field rate pulses, for altering the mode of operation of said width controlling means during each field-rate pulse occurrence to a second mode in which the width of said gating pulses is reduced to zero so as to effect a desired field-rate suppression of said gating pulses;

wherein said width controlling means includes a first resistor, a capacitor and a second resistor serially connected across said DC potential source, said second resistor being shunted by a low impedance current path during operations in said first mode; and wherein said mode altering means comprises means for disabling said current path during each field-rate pulse occurrence.

7. In a television receiver, a line-rate gating pulse generator subject to periodic field-rate disabling comprising:

a source of periodic line-rate timing pulses;

a source of periodic field-rate pulses;

a source of DC potential; and means, responsive to said timing pulses, for developing gating pulses with leading edges normally determined by the leading edges of said timing pulses;

wherein said gating pulse developing means includes a gating pulse width control circuit subject to keying by said field-rate pulses and inclusive of a first resistor, a capacitor, and a second resistor serially connected across said DC potential source; said gating pulse width control circuit operating in a first mode during periods intervening between successive field-rate appearances, in which first mode said second resistor is effectively bypassed and the RC time constant of said first resistor and said capacitor is determinative of a substantially fixed, finite width for said gating pulses; and said gating pulse width control circuit operating in a second mode during appearances of said field-rate pulses, in which second mode said second resistor is unbypassed and the width of said gating pulses is reduced to zero so as to effect a desired field-rate suppression of gating pulse appearances;

said width control circuit also including a diode connected to the junction of said capacitor and said second resistor;

wherein said gating pulse developing means also includes:

an output load across which said gating pulses are developed;

first and second transistors having normally conducting emitter-collector paths, the emitter-collector path of said first transistor being serially coupled with said output load across said DC potential source, and the emitter-collector path of said second transistor being connected in shunt with the series combination of said capacitor and said second resistor;

means for rendering the emitter-collector paths of said first and second transistors non-conductive during each timing pulse appearance;

an additional transistor having a normally non-conductive emitter-collector path connected in shunt with the emitter-collector path of said first transistor; and means for rendering the emitter-collector path of said additional transistor conducting when the voltage across said series combination of said capacitor and said second resistor exceeds a reference level; and wherein the keying of said gating pulse width control circuit is effected via said diode.

8. Apparatus in accordance with claim 7 wherein said source of field-rate pulses includes a further transistor having an emitter-collector path which is non-conductive during said field-rate pulse appearances; the series combination of the emitter-collector path of said further transistor and said diode being connected in shunt with said second resistor.

* * * * *